United States Patent
Turenne

(10) Patent No.: US 10,773,963 B2
(45) Date of Patent: Sep. 15, 2020

(54) METHOD OF PURIFYING ALUMINUM AND USE OF PURIFIED ALUMINUM TO PURIFY SILICON

(71) Applicant: Silicor Materials Inc., San Jose, CA (US)

(72) Inventor: Alain Turenne, Kitchener (CA)

(73) Assignee: Silicor Materials Inc., San Jose, CA (US)

( * ) Notice: Subject to any disclaimer, the term of this patent is extended or adjusted under 35 U.S.C. 154(b) by 148 days.

(21) Appl. No.: 15/924,259

(22) Filed: Mar. 18, 2018

(65) Prior Publication Data

US 2019/0084835 A1    Mar. 21, 2019

Related U.S. Application Data

(63) Continuation of application No. 14/409,435, filed as application No. PCT/US2013/047369 on Jun. 24, 2013, now abandoned.

(60) Provisional application No. 61/663,871, filed on Jun. 25, 2012.

(51) Int. Cl.
*C22B 21/06* (2006.01)
*C01B 33/037* (2006.01)

(52) U.S. Cl.
CPC ............ *C01B 33/037* (2013.01); *C22B 21/06* (2013.01)

(58) Field of Classification Search
CPC .............................................. C22B 21/00–062
See application file for complete search history.

(56) References Cited

U.S. PATENT DOCUMENTS

| | | | |
|---|---|---|---|
| 4,312,848 A | 1/1982 | Dawless | |
| 4,469,512 A * | 9/1984 | Shingu | C22B 21/06 75/404 |
| 4,539,194 A | 9/1985 | Halvorsen | |
| 6,861,040 B1 | 3/2005 | Ceccaroli | |
| 7,682,585 B2 | 3/2010 | Lynch | |
| 7,727,503 B2 | 6/2010 | Nichol | |
| 7,883,680 B2 | 2/2011 | Nichol | |
| 9,243,311 B2 | 1/2016 | Nichol | |
| 2009/0092535 A1 | 4/2009 | Nichol | |
| 2009/0274607 A1 | 11/2009 | Nichol | |
| 2009/0274608 A1 | 11/2009 | Enebakk | |
| 2010/0254879 A1 | 10/2010 | Nichol | |
| 2010/0329959 A1 | 12/2010 | Nichol | |
| 2011/0044877 A1 | 2/2011 | Turenne | |
| 2011/0250118 A1 | 10/2011 | Zeaiter | |
| 2015/0376017 A1 | 12/2015 | Mancini | |

FOREIGN PATENT DOCUMENTS

| | | |
|---|---|---|
| CA | 2680515 A | 9/2008 |
| CN | 1659313 A | 8/2005 |
| CN | 1994877 A | 7/2007 |

(Continued)

OTHER PUBLICATIONS

CN201380043296.9, Office Action dated Mar. 16, 2016 (10 pages).

(Continued)

*Primary Examiner* — Anthony J Zimmer
(74) *Attorney, Agent, or Firm* — Incubate IP; Randy R. Micheletti

(57) ABSTRACT

The present invention provides a method of purifying aluminum, and/or use of the purified aluminum as a solvent metal to purify silicon.

12 Claims, 4 Drawing Sheets

(56) References Cited

FOREIGN PATENT DOCUMENTS

| | | | |
|---|---|---|---|
| CN | 101460399 | A | 6/2009 |
| CN | 101668701 | A | 3/2010 |
| CN | 101855391 | A | 10/2010 |
| CN | 102616787 | A | 8/2012 |
| DE | 112008000682 | | 2/2010 |
| EP | 0099948 | A1 | 2/1984 |
| JP | 2002097528 | A * | 4/2002 |
| JP | 2002173718 | A | 6/2002 |
| JP | 2002194453 | A | 7/2002 |
| JP | 2015529741 | A | 10/2015 |
| TW | 200711999 | A | 4/2007 |
| TW | 200801262 | A | 1/2008 |
| TW | 200806577 | A | 2/2008 |
| WO | 2008110012 | A1 | 9/2008 |
| WO | 2009012583 | A1 | 1/2009 |
| WO | 2014004392 | A1 | 1/2014 |
| WO | 2014004463 | A1 | 1/2014 |

OTHER PUBLICATIONS

CN201380043296.9, Response dated Jul. 29, 2016 (20 pages).
CN201380043296.9, Office Action dated Nov. 1, 2016 (16 pages).
CN201380043296.9, Response dated Jan. 16, 2017 (4 pages).
CN201380043296.9, Office Action dated Apr. 7, 2017 (8 pages).
CN201380043865.X, Office Action dated Nov. 13, 2015 (15 pages).
CN201380043865.X, Response dated Mar. 28, 2016 (28 pages).
CN201380043865.X, Office Action dated May 13, 2016 (22 pages).
CN201380043865.X, Response dated Sep. 27, 2016 (15 pages).
CN201380043865.X, Office Action dated Dec. 30, 2016 (15 pages).
CN201380043865.X, Response dated Mar. 10, 2017 (9 pages).
EP13735143.3, Office Action dated Feb. 12, 2015 (2 pages).
EP13735143.3, Office Action dated Oct. 18, 2016 (6 pages).
EP13735143.3, Response dated Feb. 8, 2017 (61 pages).
EP13739310.4, Office Action dated Feb. 13, 2015 (2 pages).
EP13739310.4, Commc'n Pursuant to Art. 94(3) EPC dated Dec. 6, 2016 (5 pages).
EP13739310.4, Response dated Mar. 22, 2017 (9 pages).
JP2015-520369, Response dated Mar. 24, 2015 (8 pages).
JP2015-520369, Office Action dated Jul. 23, 2015 (6 pages).
JP2015-520369, Response dated Nov. 2, 2015 (14 pages).
JP2015-520369, Final Refusal dated Jan. 25, 2016 (5 pages).
JP2015-520369, Notice of Appeal dated May 12, 2016 (17 pages).
JP2015-520390, Office Action dated Mar. 9, 2016 (35 pages).
JP2015-520390, Response dated May 30, 2016 (23 pages).
JP2015-520390, Office Action dated Nov. 2, 2016 (6 pages).
JP2015-520390, Response dated Jan. 12, 2017 (17 pages).
JP2015-520390, Final Refusal dated Feb. 22, 2017 (8 pages).
KR10-2015-7001827, Office Action dated Jun. 14, 2016 (9 pages).
KR10-2015-7001827, Response dated Aug. 12, 2016 (37 pages).
KR10-2015-7001827, Final Office Action dated Dec. 20, 2016 (6 pages).
KR10-2015-7001827, Response dated Jan. 20, 2017 (10 pages).
KR10-2015-7001827, Notice of Allowance dated Feb. 8, 2017 (7 pages).
KR10-2015-7001836, Office Action dated Apr. 11, 2016 (10 pages).
KR10-2015-7001836, Response dated May 23, 2016 (29 pages).
PCT/US2013/047369, Int'l Prelim. Report on Patentability dated Sep. 5, 2013 (4 pages).
PCT/US2013/047369, Written Opinion dated Sep. 5, 2013 (4 pages).
PCT/US2013/047548, Int'l Search Report dated Oct. 14, 2013 (3 pages).
PCT/US2013/047548, Written Opinion dated Oct. 14, 2013 (5 pages).
PCT/US2013/047548, Int'l Prelim. Report on Patentability dated Jan. 8, 2015 (7 pages).
TW102122410, Office Action dated Jul. 24, 2014 (7 pages).
TW102122410, Response dated Oct. 24, 2014 (98 pages).
TW102122459, Office Action dated May 22, 2014 (13 pages).
TW102122459, Response dated Sep. 4, 2014 (91 pages).
TW103143779, Office Action dated Jun. 17, 2015 (9 pages).
TW103143779, Response dated Oct. 15, 2015 (85 pages).
U.S. Appl. No. 14/409,536, Non-Final Office Action dated Jan. 29, 2016 (10 pages).
U.S. Appl. No. 14/409,536, Response dated Apr. 26, 2016 (16 pages).
U.S. Appl. No. 14/409,536, Final Office Action dated Jul. 22, 2016 (12 pages).
U.S. Appl. No. 14/409,536, Response dated Sep. 21, 2016 (9 pages).
U.S. Appl. No. 14/409,536, Notice of Allowance dated Oct. 6, 2016 (5 pages).
U.S. Appl. No. 14/409,536, Corrected Notice of Allowance dated Nov. 7, 2016 (2 pages).
U.S. Appl. No. 14/409,536, Notice of Allowance dated Feb. 16, 2017 (7 pages).
U.S. Appl. No. 14/409,536, Corrected Notice of Allowance dated Mar. 13, 2017 (2 pages).
Yoshikawa, et al., "Boron Removal by Titanium Addition in Solidification Refining of Silicon with Si—Al Melt," *Metallurgical and Materials Transactions B*, voil. 26B, pp. 837-842 (2005).

* cited by examiner

METHOD OF PURIFYING ALUMINUM AND USE OF PURIFIED ALUMINUM TO PURIFY SILICON

RELATED APPLICATIONS

This application claims the benefit of priority to U.S. application Ser. No. 14/409,435, filed Dec. 18, 2014, which is a national stage entry of International Application Serial No. PCT/US2013/047369, filed Jun. 24, 2013, which claims priority to U.S. Provisional Application No. 61/663,871, filed Jun. 25, 2012, each of which are hereby incorporated by reference in their entireties.

BACKGROUND

Solar cells are currently utilized as an energy source by using their ability to convert sunlight to electrical energy. Silicon is used almost exclusively as the semiconductor material in such photovoltaic cells. A significant limitation currently on the use of solar cells has to do with the cost of purifying silicon to solar grade (SG). In view of current energy demands and supply limitations, there is an enormous need for a more cost efficient way of purifying metallurgical grade (MG) silicon (or any other silicon having greater impurities than solar grade) to solar grade silicon.

Companies and research groups have been working on making upgraded metallurgical (UMG) silicon. Many of these processes are limited in that they have difficulty reducing the amount of boron. For example, the process of purifying silicon via an aluminum solvent is ultimately limited by the purity of the aluminum used. The amount of naturally occurring boron in aluminum is relatively low and can be screened from the population of castings at the primary producer's site. This can generally provide aluminum with boron content in the range of 0.6 ppmw. While this is sufficient to produce silicon crystals in the range of 0.4 ppmw, this level of boron is still considered too high to produce solar cells which do not suffer from degraded breakdown voltages. It may be possible to further improve the boron content downstream, but this approach presents its own challenges.

SUMMARY

Figure 1:
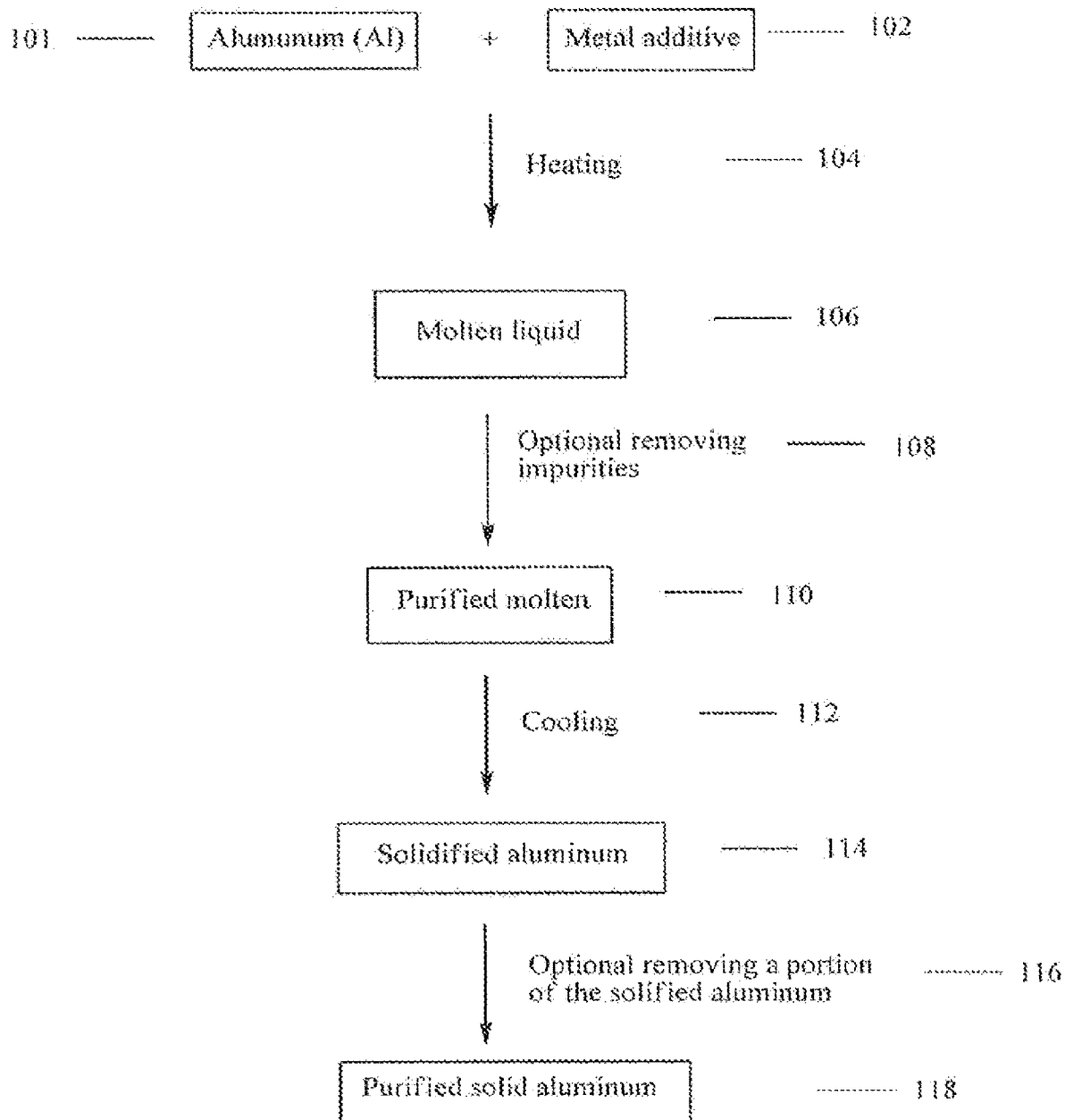
FIG. 1 illustrates a block flow diagram of a method of purifying aluminum.

The present invention provides a method for purifying aluminum. The method includes: (a) forming a molten liquid from aluminum and a metal additive selected from titanium, vanadium, zirconium, chromium, and combinations thereof; (b) allowing impurities to form in the molten liquid, wherein the impurities include a reaction product of the metal additive and boron; (c) optionally removing at least a portion of the impurities from the molten liquid; (d) cooling the molten liquid to form solidified aluminum; and (e) optionally removing a portion of the solidified aluminum including at least a portion of the impurities; wherein at least one of the optional steps is carried out, to provide purified aluminum.

The present invention also provides a method for purifying aluminum. The method includes: (a) forming a molten liquid from aluminum and titanium; (b) allowing impurities to form in the molten liquid, wherein the impurities include a reaction product of the titanium and boron; (b) optionally removing at least a portion of the impurities from the molten liquid; (d) cooling the molten liquid to form solidified aluminum; and (e) optionally removing a portion of the solidified aluminum including at least a portion of the impurities; wherein at least one of the optional steps is carried out, to provide purified aluminum.

The present invention also provides a method for purifying silicon. The method includes: (a) forming a molten liquid from silicon and aluminum, wherein the aluminum includes less than about 0.55 ppmw boron; (b) cooling the molten liquid, to form silicon crystals and a mother liquor; and (e) separating the silicon crystals and the mother liquor.

The process described herein employs reactive chemistry to achieve a reduction in the boron level of aluminum. In doing so, the metal additive (e.g., titanium) reacts with boron to form boron-containing impurities (e.g., $TiB_2$ particles). If the molten aluminum bath is treated with metal additive (e.g., titanium), boron-containing impurities (e.g., $TiB_2$ particles) can form, and can be physically separated from the majority of the aluminum. For example, the boron-containing impurities (e.g., $TiB_2$ particles) can settle to the bottom of the bath, and can then be physically separated from the majority of the aluminum. This can effectively reduce the level of boron in the aluminum, e.g., to below about 0.2 ppmw. The effect of this boron reduction on a subsequent process to purify silicon can be immediately evident. It is believed that there will be no adverse affects on solar cells, and as such, this represents an additional advantage in utilizing the metal additive (e.g., titanium) for the removal of boron. The ultimate boron level in the final silicon crystals can therefore be lowered, without the introduction of an impurity having negative attributes when present in the subsequent silicon purification process steps.

The present invention provides a method of purifying aluminum, and/or use of the purified aluminum as a solvent metal to purify silicon. Utilizing such methods, purified materials (e.g., aluminum and/or silicon) can be obtained, having relatively low amounts of boron. More consistent concentrations of impurities in the purified materials can be obtained. A purified material of more consistent quality can be obtained. The production of purified silicon crystals that can be used to generate higher quality products can be obtained. The methods can be carried out in a relatively cost-effective manner, while utilizing materials that are relatively cost-effective. A substance (e.g., metal additive, such as titanium) can be introduced during the process to purify aluminum, wherein that substance does not have any significant or appreciable adverse affects on solar cells. A substance (e.g., boron-containing substance, such as $TiB_2$) can be formed during the process to purify aluminum, wherein any remaining amount of that substance not removed, does not have any significant or appreciable adverse affects on solar cells. Less pure starting aluminum can be employed as a solvent metal in the purification of silicon. The ability to use less pure starting aluminum can lower cost and access to a greater supply of raw material.

The production of purified silicon crystals can therefore be accomplished, in a relatively cost-effective manner.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Recitation in a claim to the effect that first a step is performed, then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps may also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Definitions

As used herein, "purifying" refers to the physical separation of a substance of interest from one or more foreign or contaminating substances. In contrast, "impurities" or "impurity" refers to the one or more foreign or contaminating substances that are undesirable.

As used herein, "molten" or "molten liquid" refers to one or more substances, together, that are melted.

As used herein, "melting" refers to the process of heating one or more solid substances to a point (called the melting point), or above, where they turn into a liquid. As such, the "melting" refers to a substance changing from a solid to a liquid, when exposed to sufficient heat.

As used herein, "aluminum" refers to the chemical element that has the symbol Al and atomic number 13. The term includes metal aluminum or elemental aluminum ($Al^0$), or an alloy thereof. The aluminum will typically be used as a solvent metal.

As used herein, "solvent metal" refers to one or more metals, or an alloy thereof, which upon heating, can effectively dissolve silicon, resulting in a molten liquid. Suitable exemplary solvent metals include, e.g., aluminum or an alloy thereof, and optionally at least one of copper, tin, zinc, antimony, silver, bismuth, cadmium, gallium, indium, magnesium, lead, and alloys thereof.

As used herein, an "alloy" refers to a homogeneous mixture of two or more elements, at least one of which is a metal, and where the resulting material has metallic properties. The resulting metallic substance usually has different properties (sometimes significantly different) from those of its components.

As used herein, "titanium" refers to the chemical element that has the symbol Ti and atomic number 22. The term includes metal titanium or elemental titanium ($Ti^0$), as well as an alloy thereof. The titanium will typically be used to remove boron from the solvent metal (e.g., aluminum), by complexing with boron-containing impurities.

As used herein, "vanadium" refers to the chemical element that has the symbol V and atomic number 23. The term includes metal vanadium or elemental vanadium ($V^0$), as well as an alloy thereof. The vanadium will typically be used to remove boron from the solvent metal (e.g., aluminum), by complexing or reacting with boron-containing impurities.

As used herein, "zirconium" refers to the chemical element refers to the chemical element that has the symbol Zr and atomic number 40. The term includes metal zirconium or elemental zirconium ($Zr^0$), as well as an alloy thereof. The zirconium will typically be used to remove boron from the solvent metal (e.g., aluminum), by complexing or reacting with boron-containing impurities.

As used herein, "chromium" refers to the chemical element refers to the chemical element that has the symbol Cr and atomic number 24. The term includes metal chromium or elemental chromium ($Cr^0$), as well as an alloy thereof. The chromium will typically be used to remove boron from the solvent metal (e.g., aluminum), by complexing or reacting with boron-containing impurities.

As used herein, a "reaction product" refers to a compound formed by the chemical reaction of two or more substances. An exemplary reaction product of titanium and boron includes titanium diboride ($TiB_2$).

As used herein, "coordination complex," "metal complex" or "complex" refers to an atom or ion (usually metallic, such as titanium, vanadium, zirconium or chromium), bonded to a surrounding array of molecules or anions (including, e.g., boron), that are in turn known as ligands or complexing agents. Many metal-containing compounds consist of coordination complexes.

As used herein, "solidifying" refers to the process of cooling one or more liquid substances (e.g., molten liquid) below a point (called the melting point), where they turn into a solid. As such, the "solidifying" refers to a substance changing from a liquid to a solid, upon cooling.

As used herein, "removing" refers to the process of separating a substance from another substance (e.g., removing a solid or a liquid from a mixture) or separating a portion of a substance from another portion (e.g., removing a part of a solid from another part of the solid). The process can employ any technique known to those of skill in the art, e.g., decanting the mixture, skimming one or more liquids from the mixture, centrifuging the mixture, filtering the solids from the mixture, cutting a solid to remove a portion thereof, or a combination thereof.

As used herein, "boron" refers to the chemical element that has the symbol B and atomic number 5. The term includes compounds that include boron (i.e., boron-containing compounds that include $B^{3+}$, $B^{2+}$, or $B^+$), and combinations thereof.

As used herein, "silicon" refers to the chemical element that has the symbol Si and atomic number 14. The term includes metal or elemental silicon ($Si^0$), or an alloy thereof.

As used herein, "metallurgical grade silicon" refers to relatively pure (e.g., at least about 96.0 wt. %) silicon.

As used herein, "crystalline" includes the regular, geometric arrangement of atoms in a solid. As such, "silicon crystals" refers to silicon having regular, geometric arrangement of the silicon atoms in a solid state.

As used herein, "contacting" refers to the act of touching, making contact, or of bringing substances into immediate proximity.

As used herein, "decanting" or "decantation" includes pouring off a fluid, leaving a sediment or precipitate, thereby separating the fluid from the sediment or precipitate.

As used herein, "filtering" or "filtration" refers to a mechanical method to separate solids from liquids by passing the feed stream through a porous sheet such as a ceramic or metal membrane, which retains the solids and allows the liquid to pass through. This can be accomplished by gravity, pressure or vacuum (suction). The filtering effectively separates the sediment and/or precipitate from the liquid.

Referring to FIG. 1, an example of a block flow diagram 100 of a method for purifying aluminum is shown, according to some embodiments. A molten liquid 106 is formed from heating 104 aluminum 101 and metal additive 102. Impurities can optionally be removed 108 from the molten liquid 106 to provide a purified molten 110. Either the molten liquid 106 or the purified molten 110 is cooled 112, to provide the solidified aluminum 114. A portion of the solidified aluminum 114 can optionally be removed 116 to provide purified solid aluminum 118.

A molten liquid 106 is formed from heating 104 aluminum 101 and metal additive 102. The heating of the aluminum 101 and metal additive 102 is carried out, to achieve a temperature that will effectively form a molten liquid 106. For example, the temperature can be at least about 650° C.

Any suitable amount of metal additive 102 can be employed, provided the amount of metal additive 102 effectively provides impurities from the molten liquid 106 that can be effectively removed. For example, at least about 200 ppmw metal additive 102 can be employed, relative to the aluminum 101.

The metal additive 102 will typically be used to remove impurities (e.g., boron-containing impurities) from the solvent metal (e.g., aluminum 101). As such, aluminum 101 can be purified from boron, such that at least some of the boron is removed from the aluminum 101. For example, the aluminum 101 can include at least about 0.30 ppmw boron.

The boron-containing impurities will typically include a reaction product of metal additive 102 and boron, such as, e.g., titanium diboride ($TiB_2$). Additional impurities include those impurities formed from the reaction product of metal additive, boron, and an additional substance present in the molten liquid or which contacts the molten liquid. Additional impurities include those impurities formed from the reaction product of boron and an additional substance present in the molten liquid or which contacts the molten liquid, wherein generation of the reaction product is catalyzed by, or coordinated with, the metal additive 102. An exemplary substance present in the molten liquid, or which contacts the molten liquid, includes, e.g., oxygen.

The aluminum 101 and metal additive 102 can be present together, in the aluminum 101. In such an embodiment, the aluminum 101 will include a significant and appreciable amount of metal additive 102. Alternatively, the aluminum 101 and metal additive 102 can be separately added, either concurrently or consecutively. In such an embodiment, the molten liquid 106 can be formed from aluminum 101, and the metal additive 102 can subsequently be added. Alternatively, the molten liquid 106 can be formed from metal additive 102, and the aluminum 101 can subsequently be added. Alternatively, the molten liquid 106 can be formed from aluminum 101 and metal additive 102, and together they can be heated. In any suitable manner as described above, the molten liquid 106 is formed from heating 104 aluminum 101 and metal additive 102.

The impurities are allowed to form in the molten liquid 106, where they can optionally be removed 108. In specific embodiments, the impurities will move toward the bottom of the vessel containing the molten liquid 106. In such embodiments, the impurities can optionally be removed 108, e.g., by decanting or filtering.

The impurities are allowed to form in the molten liquid 106. It is appreciated that those of skill in the art of metallurgical chemistry understand that in the process of forming impurities in the molten liquid 106, matter is not being created. Instead, at least a portion of the boron-containing impurities present in the molten liquid 106 (from the aluminum 101) will complex in the molten liquid 106. These boron-containing impurities will be transformed to new boron-containing impurities (e.g., a reaction product of metal additive and boron) that can optionally be removed from the molten liquid 106.

In specific embodiments, the optional step of removing the at least a portion of the impurities 108 from the molten liquid 106 is carried out. In alternative specific embodiments, the optional step of removing the at least a portion of the impurities 108 from the molten liquid 106 is not carried out.

The molten liquid 106 can be cooled 112 to form a solidified aluminum 114. Alternatively, the purified molten 110 can be cooled 112 to form a solidified aluminum 114. The cooling 112 can be carried out in any suitable manner, provided the solidified aluminum 114 is obtained. For example, the cooling 112 can be carried out at about room temperature (about 20° C.), for an extended period of time. Upon cooling 112, a portion of the solidified aluminum 114 can optionally be removed 116. In those specific embodiments in which the impurities will move toward the bottom of the vessel containing the molten liquid 106, the bottom portion of the solidified aluminum 114 can be removed (i.e., the portion of the solidified aluminum 114 including a significant amount of the impurities). That portion of the solidified aluminum 114 can be removed by any suitable means. For example, that portion of the solidified aluminum 114 can be mechanically removed, for example, by cutting the solidified aluminum 114.

Alternatively, in those specific embodiments in which the impurities will move toward the sides of the vessel containing the molten liquid 106, the side portions of the solidified aluminum 114 can be removed (i.e., the portion of the solidified aluminum 114 including a significant amount of the impurities). Moving the impurities toward the sides of the vessel containing the molten liquid 106 can be accomplished, e.g., by spinning or centrifuging the vessel containing the molten liquid 106.

Alternatively, in those specific embodiments in which the impurities will move toward the top of the vessel containing the molten liquid 106, the top portions of the solidified aluminum 114 can be removed (i.e., the portion of the solidified aluminum 114 including a significant amount of the impurities). Moving the impurities toward the top of the vessel containing the molten liquid 106 can be accomplished, e.g., by introducing substances to the molten liquid 106 that will result in the impurities floating or rising to the surface of the molten liquid 106.

In specific embodiments, the optional step of removing a portion of the solidified aluminum 116 is carried out. In alternative specific embodiments, the optional step of removing a portion of the solidified aluminum 116 is not carried out.

In specific embodiments, the optional step of removing the at least a portion of the impurities from the molten liquid 108 is carried out, and the optional step of removing a portion of the solidified aluminum is 116 carried out.

In specific embodiments, the method for purifying aluminum 100 can be carried out once. In alternative specific embodiments, the method for purifying aluminum 100 can be carried out two or more (e.g., 2, 3 or 4) times.

The method for purifying aluminum 100 provides purified solid aluminum 118 that is relatively pure, compared to the starting aluminum 101. This purified solid aluminum 118 can then be used, e.g., as a solvent metal for the purification of silicon (see, FIG. 2). For example, the method for purifying aluminum 100 provides purified solid aluminum 118 that is purified from boron, such that at least some of the boron is removed from the starting aluminum 101. As such, a significant and appreciable amount of boron present in the starting aluminum 101 can be removed to provide the purified solid aluminum 118.

Figure 3:
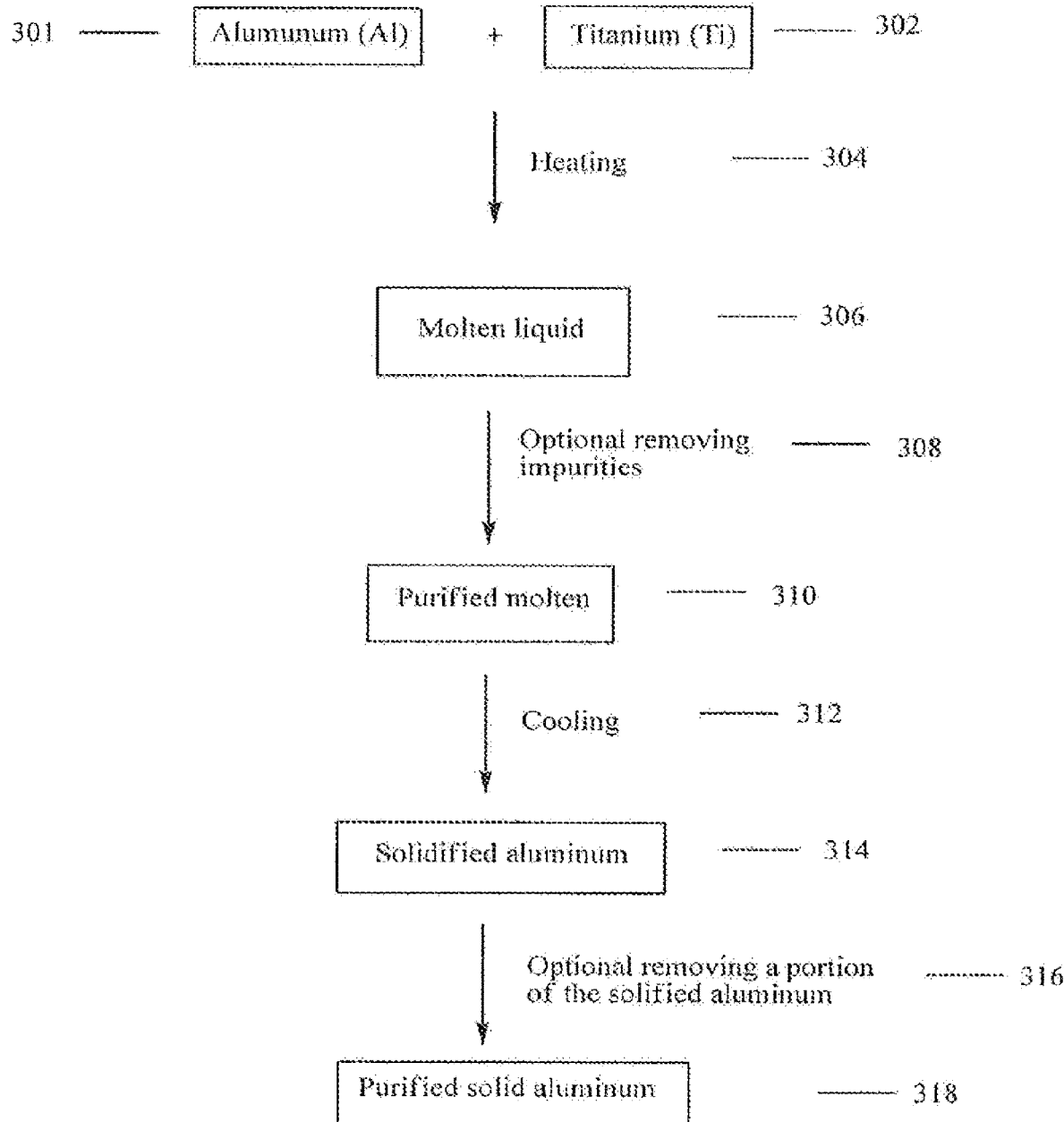
FIG. 3 illustrates a block flow diagram of a method of purifying aluminum.

Referring to FIG. 3, an example of a block flow diagram 300 of a method for purifying aluminum is shown, according to some embodiments. A molten liquid 306 is formed from heating 304 aluminum 301 and titanium 302. Impurities can optionally be removed 308 from the molten liquid 306 to provide a purified molten 310. Either the molten liquid 306 or the purified molten 310 is cooled 312, to provide the solidified aluminum 314. A portion of the solidified aluminum 314 can optionally be removed 316 to provide purified solid aluminum 318.

A molten liquid 306 is formed from heating 304 aluminum 301 and titanium 302. The heating of the aluminum 301 and titanium 302 is carried out, to achieve a temperature that will effectively form a molten liquid 306. For example, the temperature can be at least about 650° C.

Any suitable amount of titanium 302 can be employed, provided the amount of titanium 302 effectively provides impurities from the molten liquid 306 that can be effectively removed. For example, at least about 200 ppmw titanium 302 can be employed, relative to the aluminum 301.

The titanium 302 will typically be used to remove impurities (e.g., boron-containing impurities) from the solvent metal (e.g., aluminum 301). As such, aluminum 301 can be purified from boron, such that at least some of the boron is removed from the aluminum 301. For example, the aluminum 301 can include at least about 0.30 ppmw boron.

The boron-containing impurities will typically include a reaction product of titanium 302 and boron, such as, e.g., titanium diboride ($TiB_2$). Additional impurities include those impurities formed from the reaction product of titanium, boron, and an additional substance present in the molten liquid or which contacts the molten liquid. Additional impurities include those impurities formed from the reaction product of boron and an additional substance present in the molten liquid or which contacts the molten liquid, wherein generation of the reaction product is catalyzed by, or coordinated with, the titanium 302. An exemplary substance present in the molten liquid, or which contacts the molten liquid, includes, e.g., oxygen.

The aluminum 301 and titanium 302 can be present together, in the aluminum 301. In such an embodiment, the aluminum 301 will include a significant and appreciable amount of titanium 302.

Alternatively, the aluminum 301 and titanium 302 can be separately added, either concurrently or consecutively. In such an embodiment, the molten liquid 306 can be formed from aluminum 301, and the titanium 302 can subsequently be added. Alternatively, the molten liquid 306 can be formed from titanium 302, and the aluminum 301 can subsequently be added. Alternatively, the molten liquid 306 can be formed from aluminum 301 and titanium 302, and together they can be heated. In any suitable manner as described above, the molten liquid 306 is formed from heating 304 aluminum 301 and titanium 302.

The impurities are allowed to form in the molten liquid 306, where they can optionally be removed 308. In specific embodiments, the impurities will move toward the bottom of the vessel containing the molten liquid 306. In such embodiments, the impurities can optionally be removed 308, e.g., by decanting or filtering.

The impurities are allowed to form in the molten liquid 306. It is appreciated that those of skill in the art of metallurgical chemistry understand that in the process of forming impurities in the molten liquid 306, matter is not being created. Instead, at least a portion of the boron-containing impurities present in the molten liquid 306 (from the aluminum 301) will complex in the molten liquid 306. These boron-containing impurities will be transformed to new boron-containing impurities (e.g., a reaction product of titanium and boron) that can optionally be removed from the molten liquid 306.

In specific embodiments, the optional step of removing the at least a portion of the impurities 308 from the molten liquid 306 is carried out. In alternative specific embodiments, the optional step of removing the at least a portion of the impurities 308 from the molten liquid 306 is not carried out.

The molten liquid 306 can be cooled 312 to form a solidified aluminum 314. Alternatively, the purified molten 310 can be cooled 312 to form a solidified aluminum 314. The cooling 312 can be carried out in any suitable manner, provided the solidified aluminum 314 is obtained. For example, the cooling 312 can be carried out at about room temperature (about 20° C.), for an extended period of time.

Upon cooling 312, a portion of the solidified aluminum 314 can optionally be removed 316. In those specific embodiments in which the impurities will move toward the bottom of the vessel containing the molten liquid 306, the bottom portion of the solidified aluminum 314 can be removed (i.e., the portion of the solidified aluminum 314 including a significant amount of the impurities). That portion of the solidified aluminum 314 can be removed by any suitable means. For example, that portion of the solidified aluminum 314 can be mechanically removed, for example, by cutting the solidified aluminum 314.

Alternatively, in those specific embodiments in which the impurities will move toward the sides of the vessel containing the molten liquid 306, the side portions of the solidified aluminum 314 can be removed (i.e., the portion of the solidified aluminum 314 including a significant amount of the impurities). Moving the impurities toward the sides of the vessel containing the molten liquid 306 can be accomplished, e.g., by spinning or centrifuging the vessel containing the molten liquid 306.

Alternatively, in those specific embodiments in which the impurities will move toward the top of the vessel containing the molten liquid 306, the top portions of the solidified aluminum 314 can be removed (i.e., the portion of the solidified aluminum 314 including a significant amount of the impurities). Moving the impurities toward the top of the vessel containing the molten liquid 306 can be accomplished, e.g., by introducing substances to the molten liquid 306 that will result in the impurities floating or rising to the surface of the molten liquid 306.

In specific embodiments, the optional step of removing a portion of the solidified aluminum 316 is carried out. In alternative specific embodiments, the optional step of removing a portion of the solidified aluminum 316 is not carried out.

In specific embodiments, the optional step of removing the at least a portion of the impurities from the molten liquid 308 is carried out, and the optional step of removing a portion of the solidified aluminum is 316 carried out.

In specific embodiments, the method for purifying aluminum 300 can be carried out once. In alternative specific embodiments, the method for purifying aluminum 300 can be carried out two or more (e.g., 2, 3 or 4) times.

The method for purifying aluminum 300 provides purified solid aluminum 318 that is relatively pure, compared to the starting aluminum 301. This purified solid aluminum 318 can then be used, e.g., as a solvent metal for the purification of silicon (see, FIG. 2). For example, the method for purifying aluminum 300 provides purified solid aluminum 318 that is purified from boron, such that at least some of the boron is removed from the starting aluminum 301. As such, a significant and appreciable amount of boron present in the starting aluminum 301 can be removed to provide the purified solid aluminum 318.

Figure 2:
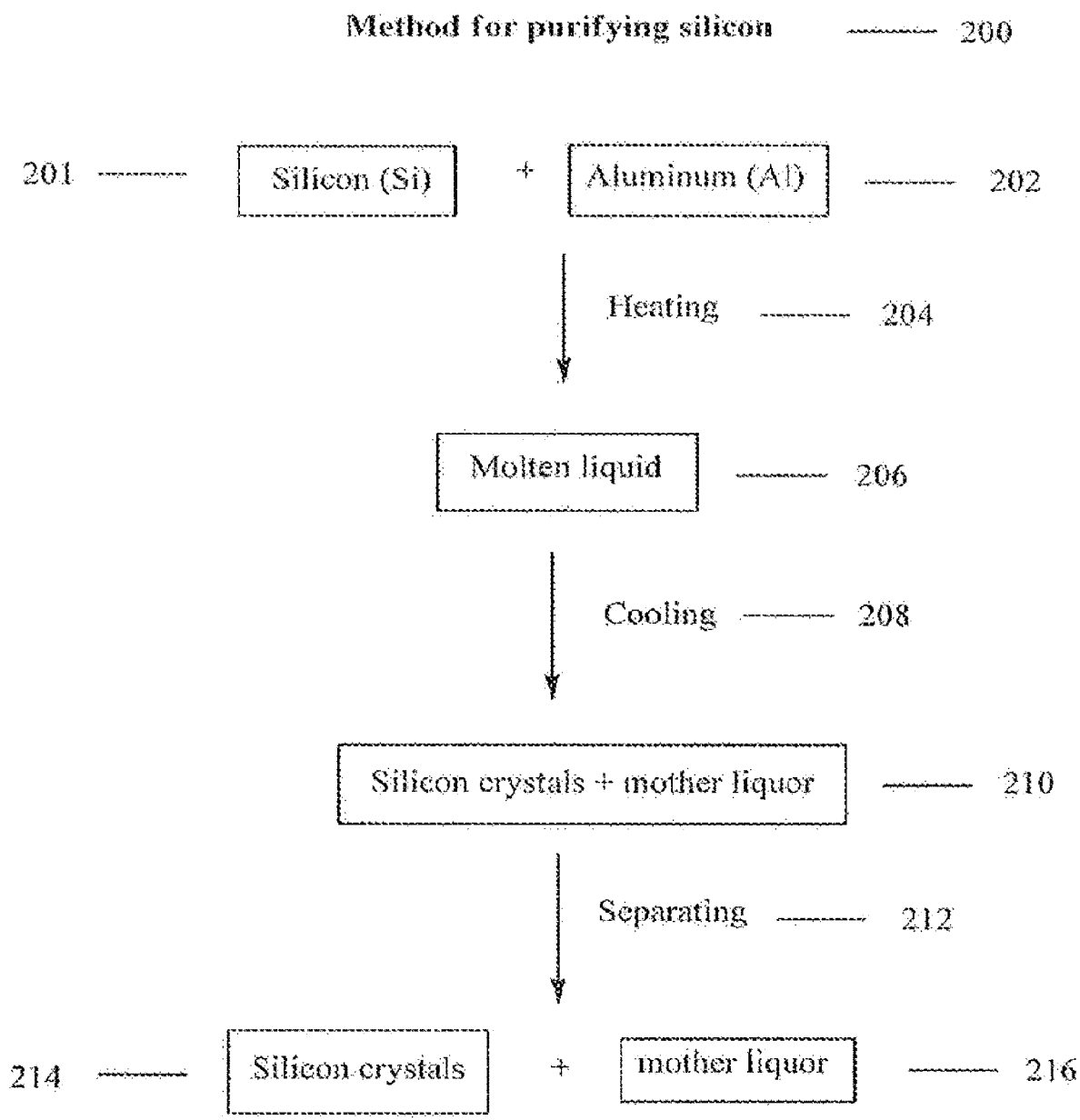
FIG. 2 illustrates a block flow diagram of a method of purifying silicon.

Referring to FIG. 2, an example of a block flow diagram 200 of a method for purifying silicon is shown, according to some embodiments. A molten liquid 206 is formed from silicon 201 and aluminum 202. The molten liquid 206 is cooled 208 to provide silicon crystals and mother liquor 210. The silicon crystals and mother liquor 210 are separated, to provide silicon crystals 214 and mother liquor 216.

A molten liquid 206 is formed from silicon 201 and aluminum 202. The heating 204 of the aluminum 202 and silicon 201 is carried out, to achieve a temperature that will effectively form a molten liquid 206. For example, heating 204 of the aluminum 202 and silicon 201 can be carried out, to achieve a temperature of at least about 1420° C.

Silicon 201 for processing may be generated from a number of sources. The silicon 201 may be scrap or discarded silicon from manufacturing solar cell panels, semiconductor wafers or shaping ingots, for example. Often the silicon 201 is part of a slurry. The slurry may include water, polyethylene glycol (PEG), silicon carbide, iron, aluminum, calcium, copper and other contaminants. The silicon 201 may be removed from the slurry (e.g., separated) and dried to remove excess water. The powder may be separated from the slurry by centrifuge, settling or other processes. Adding water to the slurry can lower the specific gravity to help improve the settling or centrifuging. The silicon 201 may undergo further processing to remove contaminants, such as by undergoing an acid treatment, for example. For example, hydrochloric acid can be used to dissolve the metals, such as iron, off of the surface of the silicon powder. Hydrofluoric acid, hydrochloric acid, nitric acid or a combination thereof may be used to dissolve silicon dioxide off of the surface of the powder or to dissolve the surface of the powder. Alternatively, potassium hydroxide, sodium hydroxide or a combination thereof may be used to dissolve the surface of the powder. The powder may also be treated with a magnetic separating process to remove iron and other magnetic elements.

Alternatively, in specific embodiments, the silicon 201 employed can be the silicon crystals 214 obtained in a previous purification process. Specifically, the method for purifying silicon 200 can provide silicon crystals 214. These silicon crystals 214 can then be employed (as silicon 201) in a subsequent method for purifying silicon 200. This can be carried out one or more (e.g., two, three of four) times.

Specifically, the silicon 201 can include metallurgical grade (MG) silicon. Alternatively, the silicon 201 can be of a grade or quality that is below metallurgical grade (MG) silicon. Employing less pure silicon (e.g., silicon of a grade or quality that is below metallurgical grade (MG) silicon) can provide cost-savings, as well as allowing for the use of silicon that would otherwise not be feasible or practical.

The molten liquid 206 can be formed from silicon 201 and aluminum 202. The silicon 201 can be heated 204 under submersion, thus limiting or preventing the silicon 201 from contacting an oxygenated environment. By limiting such contact with oxygen, the silicon 201 has less chance to react to form the undesirable product silicon dioxide. By submerging the silicon 201 during melting, expensive and complicated steps are unnecessary, such as having to use a vacuum or inert gas atmosphere, for example. Additionally, prior to contacting silicon 201 with aluminum, the silicon 201 can be pretreated with an acid treatment, magnetic separation, vacuum melting, drying or a combination thereof. One or more of these steps may facilitate the removal of contaminants, such as iron.

The molten liquid 206 can be formed from silicon 201 and aluminum 202, such as by feeding into a vortex using a rotary degasser, molten metal pump, rotary furnace or by induction currents. The silicon 201 may be substantially dried and fed consistently into the vortex, thus limiting its contact with oxygen. The silicon 201 may be sheared into individual grains, such as by setting the mixer settings for high shear. The melting may occur under submersion in a molten bath. For example, the bath may be below the liquidus temperature and above the solidus temperature, so that it is easier to put more shear on the powder and easier to keep the powder submerged in the bath due to the increased viscosity of the bath. The furnace refractory may be low in contaminates, such as by having little to no phosphorus or boron in the material. Fused silica and/or fused alumina may be an example of an acceptable refractory.

Similarly, if a rotary degasser or molten metal pump is utilized, they may be manufactured with little phosphorus or boron to minimize contamination.

The silicon 201 and aluminum 202 may be kept submerged by utilizing melt turbulence. The melting may occur under mixing conditions in which the temperature is maintained above the solidus temperature. The melting provides a molten liquid 206.

The silicon 201 and solvent metal (e.g., aluminum 202) can each be present in any suitable amount or ratio, provided the molten liquid 206 can effectively be formed (after heating 204). For example, the silicon 201 can be employed in about 20 wt. % to about 50 wt. %, and aluminum 202 can be employed as the solvent metal, in about 50 wt. % to about 80 wt. %. Utilizing silicon waste streams, the silicon 201 may be present in about 20 wt. % to about 90 wt. % or more. Aluminum 202 may be then employed as the solvent metal in a ratio of less than about 10 wt. % to about 80 wt. % for example. The silicon 201 may be used as the only source of silicon, or may be used as a percentage of the silicon added to the process. By varying the amounts and types of silicon used in the process, the chemistry of the resultant purified silicon may be changed or controlled.

The aluminum 202 will typically be used as a solvent metal, to remove impurities from the silicon 201. Utilizing aluminum 202 that is relatively pure (while being relatively inexpensive) is typically advantageous, especially in the solar industry. As such, the aluminum 202 employed in the method to purify silicon can be the purified solid aluminum 118, as described herein (see, FIG. 1 or FIG. 3). For example, the aluminum 202 can include up to about 0.75 ppmw boron.

The aluminum 202 and silicon 201 can be present together. Specifically, the molten liquid 206 can be formed from aluminum 202 and silicon 201, wherein together they can be heated to form the molten liquid 206. Additionally, the aluminum 202 and silicon 201 can be separately added, either concurrently or consecutively. Alternatively, the molten liquid 206 can be formed from aluminum 202, and the silicon 201 can subsequently be added. Alternatively, the molten liquid 206 can be formed from silicon 201, and the aluminum 202 can subsequently be added. In any suitable manner as described above, the molten liquid 206 is formed from heating 204 aluminum 202 and silicon 201.

The molten liquid 206 can be cooled 208 to form silicon crystals and mother liquor 210. The cooling 208 can be carried out in any suitable manner, provided the silicon crystals and mother liquor 210 are obtained. For example, the cooling 208 can be carried out at a suitable temperature, e.g., at about room temperature (20° C.), for an extended period of time. Additionally, the cooling 208 can be carried out at a suitable rate, e.g., up to about 150° C./hr. Upon cooling 208, the silicon crystals and mother liquor 210 can be separated, to provide separated silicon crystals 214 and mother liquor 216. The separation can be carried out utilizing any suitable technique, such as, e.g., decanting (e.g., pouring off the mother liquor from the silicon crystals), and/or filtering.

As stated above, the molten liquid 206 may be cooled 208 to provide silicon crystals 214 and a mother liquor 216. In one embodiment, the molten liquid 206 can be cooled 208 without any significant or appreciable agitation of the molten liquid 206. Alternatively, the molten liquid 206 can be cooled 208 while agitating the molten liquid 206. Without being bound to any particular theory, it is believed that during the cooling 208, agitating can provide relatively small silicon crystals, which can be difficult to strain, of a relatively high purity. In specific embodiments, a small amount of mixing can provide silicon crystals of about 1 mm (thickness), by about 5 mm (width), by about 5 mm (length).

Additionally, the molten liquid 206 can be cooled 208 to any suitable and appropriate temperature (such as between the liquidus and solidus temperature), provided silicon crystals are obtained in a mother liquor 216. For example, the molten liquid 206 can be cooled 208 to a temperature of about 585-1400° C.

The molten liquid 206 can be cooled 208 at any suitable any appropriate rate, provided silicon crystals 214 are obtained in a mother liquor 216. For example, the molten liquid 206 can be cooled 208 at a rate of up to about 150° C./hr.

The molten liquid 206 can be cooled 208 over any suitable and appropriate period of time, provided silicon crystals are obtained in a mother liquor 216. For example, the molten liquid 206 can be cooled 208 over a period of time of at least about 2 hours.

The silicon crystals 214 and the mother liquor 216 can be separated 212. The separation 212 can be carried out in any suitable and appropriate manner. For example, the separation 212 can be carried out by pouring off the mother liquor 216 from the silicon crystals 214. Alternatively, the separation 212 can be carried out by straining and/or filtering the silicon crystals 214 from the mother liquor 216.

Alternatively, the separation 212 can be carried out employing centrifugation.

In one specific embodiment, the silicon crystals 214 obtained can be employed or re-used as the silicon 201 in a subsequent purification. This re-use can be carried out multiple times (e.g., 2, 3, 4 or 5), to provide silicon crystals 214 having a requisite purity level. As such, the method for purifying silicon 200, to provide silicon crystals 214, can be carried out once. In alternative embodiments, the method for purifying silicon 200, to provide silicon crystals 214, can be carried out two or more (e.g., 2, 3, 4 or 5) times.

The method for purifying silicon 200 provides silicon crystals 214 that are relatively pure, compared to the silicon 201. These silicon crystals 214 can then be used, with or without subsequent purification, e.g., in the manufacturing of solar cells, which can subsequently be used in the manufacturing of solar panels. The method for purifying silicon 200 provides silicon crystals 214 that are purified from boron, such that at least some of the boron is removed from the starting silicon 201. For example, the silicon crystals 214 can include less than about 0.55 ppmw boron. Additionally, up to about 85 wt. % of boron present in the starting silicon 201 can be removed to provide the silicon crystals 214. The resulting silicon crystals 214 will therefore be relatively pure. For example, the silicon crystals 214 can include silicon in at least about 65 wt. %.

Specific ranges, values, and embodiments provided below are for illustration purposes only and do not otherwise limit the scope of the disclosed subject matter, as defined by the claims. The specific ranges, values, and embodiments described below encompass all combinations and sub-combinations of each disclosed range, value, and embodiment, whether or not expressly described as such.

Specific Ranges, Values, and Embodiments

The metal additive 102 can include titanium, vanadium, zirconium, chromium, or a combination thereof. In specific embodiments, the metal additive 102 can include vanadium, zirconium, chromium, or a combination thereof. In additional specific embodiments, the metal additive 102 can include titanium, zirconium, chromium, or a combination thereof. In additional specific embodiments, the metal additive 102 can include titanium, vanadium, chromium, or a combination thereof. In additional specific embodiments, the metal additive 102 can include titanium, vanadium, zirconium, or a combination thereof. In additional specific embodiments, the metal additive 102 can include titanium, vanadium, or a combination thereof. In additional specific embodiments, the metal additive 102 can include titanium, zirconium, or a combination thereof. In additional specific embodiments, the metal additive 102 can include titanium, chromium, or a combination thereof. In additional specific embodiments, the metal additive 102 can include vanadium, zirconium, or a combination thereof. In additional specific embodiments, the metal additive 102 can include vanadium, chromium, or a combination thereof. In additional specific embodiments, the metal additive 102 can include zirconium, chromium, or a combination thereof. In additional specific embodiments, the metal additive 102 can include titanium. In additional specific embodiments, the metal additive 102 can include vanadium. In additional specific embodiments, the metal additive 102 can include zirconium. In additional specific embodiments, the metal additive 102 can include chromium.

In specific embodiments, the heating of the aluminum 101 and metal additive 102 can be carried out, to achieve a temperature of at least about 750° C. In additional specific embodiments, the heating of the aluminum 101 and metal additive 102 can be carried out, to achieve a temperature of at least about 950° C. In additional specific embodiments, the heating of the aluminum 101 and metal additive 102 can be carried out, to achieve a temperature of about 650° C. to about 1750° C. In additional specific embodiments, the heating of the aluminum 101 and metal additive 102 can be carried out, to achieve a temperature of about 700° C. to about 1670° C.

In specific embodiments, at least about 500 ppmw metal additive 102 can be employed, relative to the aluminum 101. In additional specific embodiments, at least about 1,000 ppmw metal additive 102 can be employed, relative to the aluminum 101. In additional specific embodiments, at least about 1,500 ppmw metal additive 102 can be employed, relative to the aluminum 101. In additional specific embodiments, at least about 2,000 ppmw metal additive 102 can be employed, relative to the aluminum 101. In additional specific embodiments, at least about 2,500 ppmw metal additive 102 can be employed, relative to the aluminum 101. In additional specific embodiments, at least about 3,000 ppmw metal additive 102 can be employed, relative to the aluminum 101. In additional specific embodiments, at least about 3,500 ppmw metal additive 102 can be employed, relative to the aluminum 101. In additional specific embodiments, at least about 4,000 ppmw metal additive 102 can be employed, relative to the aluminum 101. In additional specific embodiments, at least about 4,500 ppmw metal additive 102 can be employed, relative to the aluminum 101. In additional specific embodiments, at least about 5,000 ppmw metal additive 102 can be employed, relative to the aluminum 101.

In specific embodiments, up to about 5,000 ppmw metal additive 102 can be employed, relative to the aluminum 101. In additional specific embodiments, up to about 4,500 ppmw metal additive 102 can be employed, relative to the aluminum 101. In additional specific embodiments, up to about 4,000 ppmw metal additive 102 can be employed, relative to the aluminum 101. In additional specific embodiments, up to about 3,500 ppmw metal additive 102 can be employed, relative to the aluminum 101. In additional specific embodiments, up to about 3,000 ppmw metal additive 102 can be employed, relative to the aluminum 101. In additional specific embodiments, up to about 2,500 ppmw metal additive 102 can be employed, relative to the aluminum 101. In additional specific embodiments, up to about 2,000 ppmw metal additive 102 can be employed, relative to the aluminum 101. In additional specific embodiments, up to about 1,500 ppmw metal additive 102 can be employed, relative to the aluminum 101. In additional specific embodiments, up to about 1,000 ppmw metal additive 102 can be employed, relative to the aluminum 101.

In specific embodiments, titanium is employed as a metal additive to form the molten liquid. In further specific embodiments, titanium is employed as a metal additive to form the molten liquid and the titanium forms $TiB_2$. In further specific embodiments, when the titanium forms $TiB_2$, a relatively long settling time in a quiet bath of molten melt is employed. Typically a long settling time facilitates the settling (or dropping) of the higher density $TiB_2$ to the bottom of the vessel. In specific embodiments, a settling time of at least 2 hours can be employed. In additional specific embodiments, a settling time of at least 3 hours can be employed. In additional specific embodiments, a settling time of at least 4 hours can be employed. In additional specific embodiments, a settling time of at least 5 hours can be employed. In additional specific embodiments, a settling time of at least 6 hours can be employed.

In specific embodiments, the settling is carried out in a relatively quiet bath of molten melt. In additional specific embodiments, the melt is not mixed, either by mechanical means or by simple convection. In additional specific embodiments, excessive temperatures are avoided during the settling. In additional specific embodiments, a temperature high enough to ensure the metal remains completely molten is applied.

In specific embodiments, the aluminum 101 can include at least about 0.35 ppmw boron. In additional specific embodiments, the aluminum 101 can include at least about 0.40 ppmw boron. In additional specific embodiments, the aluminum 101 can include at least about 0.45 ppmw boron. In additional specific embodiments, the aluminum 101 can include at least about 0.50 ppmw boron. In additional specific embodiments, the aluminum 101 can include at least about 0.55 ppmw boron. In additional specific embodiments, the aluminum 101 can include at least about 0.60 ppmw boron. In additional specific embodiments, the aluminum 101 can include about 0.30 ppmw to about 0.70 ppmw boron. In additional specific embodiments, the aluminum 101 can include about 0.40 ppmw to about 0.60 ppmw boron.

In specific embodiments, the cooling 112 can be carried out at a temperature of at least about 20° C. In additional specific embodiments, the cooling 112 can be carried out at a temperature of about 0° C. to about 60° C. In additional specific embodiments, the cooling 112 can be carried out at a temperature of about 15° C. to about 40° C. In additional specific embodiments, the cooling 112 can be carried out at a rate of up to about 500° C./hr, up to about 250° C./hr, up to about 125° C./hr, up to about 100° C./hr, or up to about 75° C./hr.

In specific embodiments, the purified solid aluminum 118 can include less than about 0.55 ppmw boron. In additional specific embodiments, the purified solid aluminum 118 can include less than about 0.40 ppmw boron. In additional specific embodiments, the purified solid aluminum 118 can include less than about 0.25 ppmw boron. In additional specific embodiments, the purified solid aluminum 118 can include less than about 0.20 ppmw boron. In additional specific embodiments, the purified solid aluminum 118 can include less than about 0.15 ppmw boron. In additional specific embodiments, the purified solid aluminum 118 can include less than about 0.10 ppmw boron. In specific embodiments, at least about 25 wt. % of boron present in the starting aluminum 101 can be removed to provide the purified solid aluminum 118. In additional specific embodiments, at least about 35 wt. % of boron present in the starting aluminum 101 can be removed to provide the purified solid aluminum 118. In additional specific embodiments, at least about 50 wt. % of boron present in the starting aluminum 101 can be removed to provide the purified solid aluminum 118. In additional specific embodiments, at least about 65 wt. % of boron present in the starting aluminum 101 can be removed to provide the purified solid aluminum 118.

In specific embodiments, the heating of the aluminum 301 and titanium 302 can be carried out, to achieve a temperature of at least about 750° C. In additional specific embodiments, the heating of the aluminum 301 and titanium 302 can be carried out, to achieve a temperature of at least about 950° C. In additional specific embodiments, the heating of the aluminum 301 and titanium 302 can be carried out, to achieve a temperature of about 650° C. to about 1750° C. In additional specific embodiments, the heating of the aluminum 301 and titanium 302 can be carried out, to achieve a temperature of about 700° C. to about 1670° C.

In specific embodiments, at least about 500 ppmw titanium 302 can be employed, relative to the aluminum 301. In additional specific embodiments, at least about 1,000 ppmw titanium 302 can be employed, relative to the aluminum 301. In additional specific embodiments, at least about 1,200 ppmw titanium 302 can be employed, relative to the aluminum 301.

In specific embodiments, the aluminum 301 can include at least about 0.35 ppmw boron. In additional specific embodiments, the aluminum 301 can include at least about 0.40 ppmw boron. In additional specific embodiments, the aluminum 301 can include at least about 0.45 ppmw boron. In additional specific embodiments, the aluminum 301 can include at least about 0.50 ppmw boron. In additional specific embodiments, the aluminum 301 can include at least about 0.55 ppmw boron. In additional specific embodiments, the aluminum 301 can include at least about 0.60 ppmw boron. In additional specific embodiments, the aluminum 301 can include about 0.30 ppmw to about 0.70 ppmw boron. In additional specific embodiments, the aluminum 301 can include about 0.40 ppmw to about 0.60 ppmw boron.

In specific embodiments, the cooling 312 can be carried out at a temperature of at least about 20° C. In additional specific embodiments, the cooling 312 can be carried out at a temperature of about 0° C. to about 60° C. In additional specific embodiments, the cooling 312 can be carried out at a temperature of about 15° C. to about 40° C. In additional specific embodiments, the cooling 312 can be carried out at a rate of up to about 500° C./hr, up to about 250° C./hr, up to about 125° C./hr, up to about 100° C./hr, or up to about 75° C./hr. In specific embodiments, the purified solid aluminum 318 can include less than about 0.55 ppmw boron. In additional specific embodiments, the purified solid aluminum 318 can include less than about 0.40 ppmw boron. In additional specific embodiments, the purified solid aluminum 318 can include less than about 0.25 ppmw boron. In additional specific embodiments, the purified solid aluminum 318 can include less than about 0.20 ppmw boron.

In specific embodiments, at least about 25 ppmw of boron present in the starting aluminum 301 can be removed to provide the purified solid aluminum 318. In additional specific embodiments, at least about 35 ppmw of boron present in the starting aluminum 301 can be removed to provide the purified solid aluminum 318. In additional specific embodiments, at least about 50 ppmw of boron present in the starting aluminum 301 can be removed to provide the purified solid aluminum 318. In additional specific embodiments, at least about 65 ppmw of boron present in the starting aluminum 301 can be removed to provide the purified solid aluminum 318.

In specific embodiments, the silicon 201 can include metallurgical grade (MG) silicon. In additional specific embodiments, the silicon 201 can be of a grade or quality that is below metallurgical grade (MG) silicon. In additional specific embodiments, the silicon 201 can be below about 98 wt. % pure. In additional specific embodiments, the silicon 201 can be below about 95 wt. % pure. In additional specific embodiments, the silicon 201 can be below about 90 wt. % pure. In additional specific embodiments, the silicon 201 can be below about 85 wt. % pure. In additional specific embodiments, the silicon 201 can be below about 80 wt. % pure. In additional specific embodiments, the silicon 201 can be below about 75 wt. % pure. In additional specific embodiments, the silicon 201 can be below about 70 wt. %) pure. In additional specific embodiments, the silicon 201 can be below about 65 wt. % pure. In additional specific embodiments, the silicon 201 can be below about 60 wt. % pure.

In specific embodiments, heating 204 of the aluminum 202 and silicon 201 can be carried out, to achieve a temperature of at least about 1450° C. In additional specific embodiments, the heating 204 of the aluminum 202 and silicon 201 can be carried out, to achieve a temperature of at least about 1500° C. In additional specific embodiments, heating 204 of the aluminum 202 and silicon 201 can be carried out, to achieve a temperature of at least about 1550° C. In additional specific embodiments, heating 204 of the aluminum 202 and silicon 201 can be carried out, to achieve a temperature of at least about 1600° C. In additional specific embodiments, heating 204 of the aluminum 202 and silicon 201 can be carried out, to achieve a temperature of at least about 1700° C.

In specific embodiments, the aluminum 202 can include up to several thousand (e.g., 4,000) parts per million (weight) of boron. In such embodiments, the crude aluminum can be "recycled" aluminum that is obtained, e.g., from the electrical industry. Such aluminum will include the relatively large amount of boron due to the boron being added to remove substances, such as titanium, from the aluminum. In additional specific embodiments, the aluminum 202 can include up to about 3 ppmw boron. In additional specific embodiments, the aluminum 202 can include up to about 0.60 ppmw boron. In additional specific embodiments, the aluminum 202 can include up to about 0.55 ppmw boron. In additional specific embodiments, the aluminum 202 can include up to about 0.50 ppmw boron. In additional specific embodiments, the aluminum 202 can include up to about 0.45 ppmw boron. In additional specific embodiments, the aluminum 202 can include up to about 0.40 ppmw boron. In additional specific embodiments, the aluminum 202 can include up to about 0.25 ppmw boron. In additional specific embodiments, the aluminum 202 can include up to about 0.20 ppmw boron.

In specific embodiments, the cooling 208 can be carried out at a temperature of at least about 10° C. In additional specific embodiments, the cooling 208 can be carried out at a temperature of at least about 15° C. In additional specific embodiments, the cooling 208 can be carried out at a temperature of up to about 50° C. In additional specific embodiments, the cooling 208 can be carried out at a temperature of up to about 40° C. In additional specific embodiments, the cooling 208 can be carried out at a temperature of about 10° C. to about 50° C. In additional specific embodiments, the cooling 208 can be carried out at a temperature of about 15° C. to about 40° C.

In specific embodiments, the cooling 208 can be carried out at a rate of up to about 125° C./hr. In additional specific embodiments, the cooling 208 can be carried out at a rate of up to about 100° C./hr. In additional specific embodiments, the cooling 208 can be carried out at a rate of up to about 75° C./hr.

In specific embodiments, the molten liquid 206 can be cooled 208 close to, but above the solidus temperature (e.g., within about 200° C. above the solidus temperature, within about 125° C. above the solidus temperature, or within about 50° C. above the solidus temperature). In additional specific embodiments, the molten liquid 206 can be cooled 208 to a temperature of about 700° C. to about 750° C. In additional specific embodiments, the molten liquid 206 can be cooled 208 to above the solidus temperature and below the liquidus temperature. In additional specific embodiments the molten liquid 206 may be cooled 208 to a temperature below the liquidus temperature.

In specific embodiments, the molten liquid 206 can be cooled 208 at a rate of up to about 100° C./hr. In additional specific embodiments, the molten liquid 206 can be cooled 208 at a rate of up to about 50° C./hr. In additional specific embodiments, the molten liquid 206 can be cooled 208 at a rate of up to about 20° C./hr.

In specific embodiments, the molten liquid 206 can be cooled 208 over a period of time of at least about 2 hours. In additional specific embodiments, the molten liquid 206 can be cooled 208 over a period of time of at least about 4 hours. In additional specific embodiments, the molten liquid 206 can be cooled 208 over a period of time of at least about 8 hours. In additional specific embodiments, the molten liquid 206 can be cooled 208 over a period of time of at least about 12 hours. In additional specific embodiments, the molten liquid 206 can be cooled 208 over a period of time of at least about 24 hours. In additional specific embodiments, the molten liquid 206 can be cooled 208 over a period of time of at least about 48 hours.

In specific embodiments, the silicon crystals 214 can include less than about 0.50 ppmw boron. In additional specific embodiments, the silicon crystals 214 can include less than about 0.45 ppmw boron. In additional specific embodiments, the silicon crystals 214 can include less than about 0.40 ppmw boron. In additional specific embodiments, the silicon crystals 214 can include less than about 0.35 ppmw boron. In additional specific embodiments, the silicon crystals 214 can include less than about 0.30 ppmw boron. In additional specific embodiments, the silicon crystals 214 can include less than about 0.25 ppmw boron. In additional specific embodiments, the silicon crystals 214 can include less than about 0.20 ppmw boron.

In specific embodiments, at least about 25 wt. % of boron present in the starting silicon 201 can be removed to provide the silicon crystals 214. In additional specific embodiments, at least about 30 wt. % of boron present in the starting silicon 201 can be removed to provide the silicon crystals 214. In additional specific embodiments, at least about 35 wt. % of boron present in the starting silicon 201 can be removed to provide the silicon crystals 214. In additional specific embodiments, at least about 40 wt. % of boron present in the starting silicon 201 can be removed to provide the silicon crystals 214. In additional specific embodiments, at least about 45 wt. % of boron present in the starting silicon 201 can be removed to provide the silicon crystals 214. In additional specific embodiments, at least about 50 wt. % of boron present in the starting silicon 201 can be removed to provide the silicon crystals 214. In additional specific embodiments, at least about 55 wt. % of boron present in the starting silicon 201 can be removed to provide the silicon crystals 214. In additional specific embodiments, at least about 60 wt. % of boron present in the starting silicon 201 can be removed to provide the silicon crystals 214. In additional specific embodiments, at least about 65 wt. % of boron present in the starting silicon 201 can be removed to provide the silicon crystals 214. In additional specific embodiments, at least about 70 wt. % of boron present in the starting silicon 201 can be removed to provide the silicon crystals 214. In additional specific embodiments, at least about 75 wt. % of boron present in the starting silicon 201 can be removed to provide the silicon crystals 214. In additional specific embodiments, at least about 80 wt. % of boron present in the starting silicon 201 can be removed to provide the silicon crystals 214.

In specific embodiments, the silicon crystals 214 can include silicon in at least about 70 wt. %. In additional specific embodiments, the silicon crystals 214 can include silicon in at least about 75 wt. %. In additional specific embodiments, the silicon crystals 214 can include silicon in at least about 80 wt. %. In additional specific embodiments, the silicon crystals 214 can include silicon in at least about 85 wt. %. In additional specific embodiments, the silicon crystals 214 can include silicon in at least about 90 wt. %. In additional specific embodiments, the silicon crystals 214 can include silicon in at least about 95 wt. %. In additional specific embodiments, the silicon crystals 214 can include silicon in at least about 96 wt. %. In additional specific embodiments, the silicon crystals 214 can include silicon in at least about 97 wt. %. In additional specific embodiments, the silicon crystals 214 can include silicon in at least about 98 wt. %. In additional specific embodiments, the silicon crystals 214 can include silicon in at least about 99 wt. %.

Specific enumerated embodiments [1] to [39] provided below are for illustration purposes only, and do not otherwise limit the scope of the disclosed subject matter, as defined by the claims. These enumerated embodiments encompass all combinations, sub-combinations, and multiply referenced (e.g., multiply dependent) combinations described therein.

ENUMERATED EMBODIMENTS

[1.] A method for purifying aluminum, the method including:

(a) forming a molten liquid from aluminum and a metal additive selected from at least one of titanium, vanadium, zirconium, and chromium;

(b) allowing impurities to form in the molten liquid, wherein the impurities include a reaction product of the metal additive and boron;

(b) optionally removing at least a portion of the impurities from the molten liquid;

(d) cooling the molten liquid to form solidified aluminum; and (e) optionally removing a portion of the solidified aluminum including at least a portion of the impurities;

wherein at least one of the optional steps is carried out, to provide purified aluminum.

[2.] The method of embodiment [1], wherein at least some boron is removed, such that the purified aluminum contains less boron than the aluminum in step (a).

[3.] The method of any one of embodiments [1]-[2], wherein the purified aluminum includes less than about 0.55 ppmw boron.

[4.] The method of any one of embodiments [1]-[2], wherein the purified aluminum includes less than about 0.40 ppmw boron. [5.] The method of any one of embodiments [1]-[2], wherein the purified aluminum includes less than about 0.25 ppmw boron.

[6.] The method of any one of embodiments [1]-[5], wherein the molten liquid is formed at a temperature of at least about 650° C.

[7.] The method of any one of embodiments [1]-[6], wherein at least about 200 ppmw metal additive is employed, relative to the aluminum.

[8.] The method of any one of embodiments [1]-[6], wherein at least about 500 ppmw metal additive is employed, relative to the aluminum.

[9.] The method of any one of embodiments [1]-[6], wherein at least about 1,000 ppmw metal additive is employed, relative to the aluminum.

[10.] The method of any one of embodiments [1]-[9], wherein metal additive includes titanium.

[11.] The method of any one of embodiments [1]-[10], wherein the aluminum in step (a) includes at least about 0.40 ppmw boron.

[12.] The method of any one of embodiments [1]-[10], wherein the aluminum in step (a) includes about 0.40 ppmw to about 0.60 ppmw boron.

[13.] The method of any one of embodiments [1]-[12], wherein the impurities that include a reaction product of metal additive and boron include titanium diboride ($TiB_2$).

[14.] The method of any one of embodiments [1]-[13], wherein the removing of the portion of the solidified aluminum is carried out mechanically.

[15.] The method of any one of embodiments [1]-[13], wherein the removing of the portion of the solidified aluminum is carried out by cutting the solidified aluminum.

[16.] The method of any one of embodiments [1]-[15], wherein the aluminum and metal additive are present together in the aluminum in step (a).

[17.] The method of any one of embodiments [1]-[15], wherein the metal additive is added to the aluminum in step (a), is added to the molten liquid, or a combination thereof.

[18.] The method of any one of embodiments [1]-[17], wherein the impurities that include the reaction product of metal additive and boron include a reaction product of metal additive, boron, and an additional substance present in the molten liquid or which contacts the molten liquid.

[19.] The method of any one of embodiments [1]-[17], wherein the optional step of removing the at least a portion of the impurities from the molten liquid is carried out.

[20.] The method of any one of embodiments [1]-[17], wherein the optional step of removing the at least a portion of the impurities from the molten liquid is not carried out.

[21.] The method of any one of embodiments [1]-[17], wherein the optional step of removing a portion of the solidified aluminum including at least a portion of the impurities is carried out.

[22.] The method of any one of embodiments [1]-[17], wherein the optional step of removing a portion of the solidified aluminum including at least a portion of the impurities is not carried out.

[23.] The method of any one of embodiments [1]-[17], wherein the optional step of removing the at least a portion of the impurities from the molten liquid is carried out, and the optional step of removing a portion of the solidified aluminum including at least a portion of the impurities is carried out.

[24.] The method of any one of embodiments [1]-[23], which is carried out two or more times.

[25.] A method for purifying silicon, the method including:
(a) forming a molten liquid from silicon and aluminum, wherein the aluminum includes less than about 0.55 ppmw boron;
(b) cooling the molten liquid, to form silicon crystals and a mother liquor; and
(e) separating the silicon crystals and the mother liquor.

[26.] The method of embodiment [25], wherein the aluminum includes the purified aluminum or solidified aluminum as recited in any one of embodiments [1]-[24].

[27.] The method of embodiment [25], wherein the aluminum includes less than about 0.25 ppmw boron.

[28.] The method of embodiment [25], wherein the aluminum includes less than about 0.10 ppmw boron.

[29.] The method of any one of embodiments [25]-[28], wherein the silicon crystals include less than about 0.40 ppmw boron.

[30.] The method of any one of embodiments [25]-[27], wherein the silicon crystals include less than about 0.25 ppmw boron.

[31.] The method of any one of embodiments [25]-[28], wherein the silicon crystals include about 0.20 ppmw boron.

[32.] The method of any one of embodiments [25]-[31], wherein in step (a), the silicon is metallurgical grade (MG) silicon.

[33.] The method of any one of embodiments [25]-[31], wherein in step (a), the silicon is employed in about 20 wt. % to about 50 wt. %.

[34.] The method of any one of embodiments [25]-[32], wherein in step (a), the aluminum is employed in about 50 wt. % to about 80 wt. %.

[35.] The method of any one of embodiments [25]-[34], wherein in step (b), the molten liquid is cooled at a rate of less than about 75° C./hr.

[36.] The method of any one of embodiments [25]-[35], wherein in step (b), the molten liquid is cooled over a period of time of at least about 2 hours.

[37.] The method of any one of embodiments [25]-[36], wherein step (c) is carried out by pouring off the mother liquor from the silicon crystals.

[38.] The method of any one of embodiments [25]-[37], wherein the silicon crystals include silicon in at least about 65 wt. %.

[39.] The method of any one of embodiments [25]-[38], which is carried out two or more times.

EXAMPLES

Example 1

Figure 4:
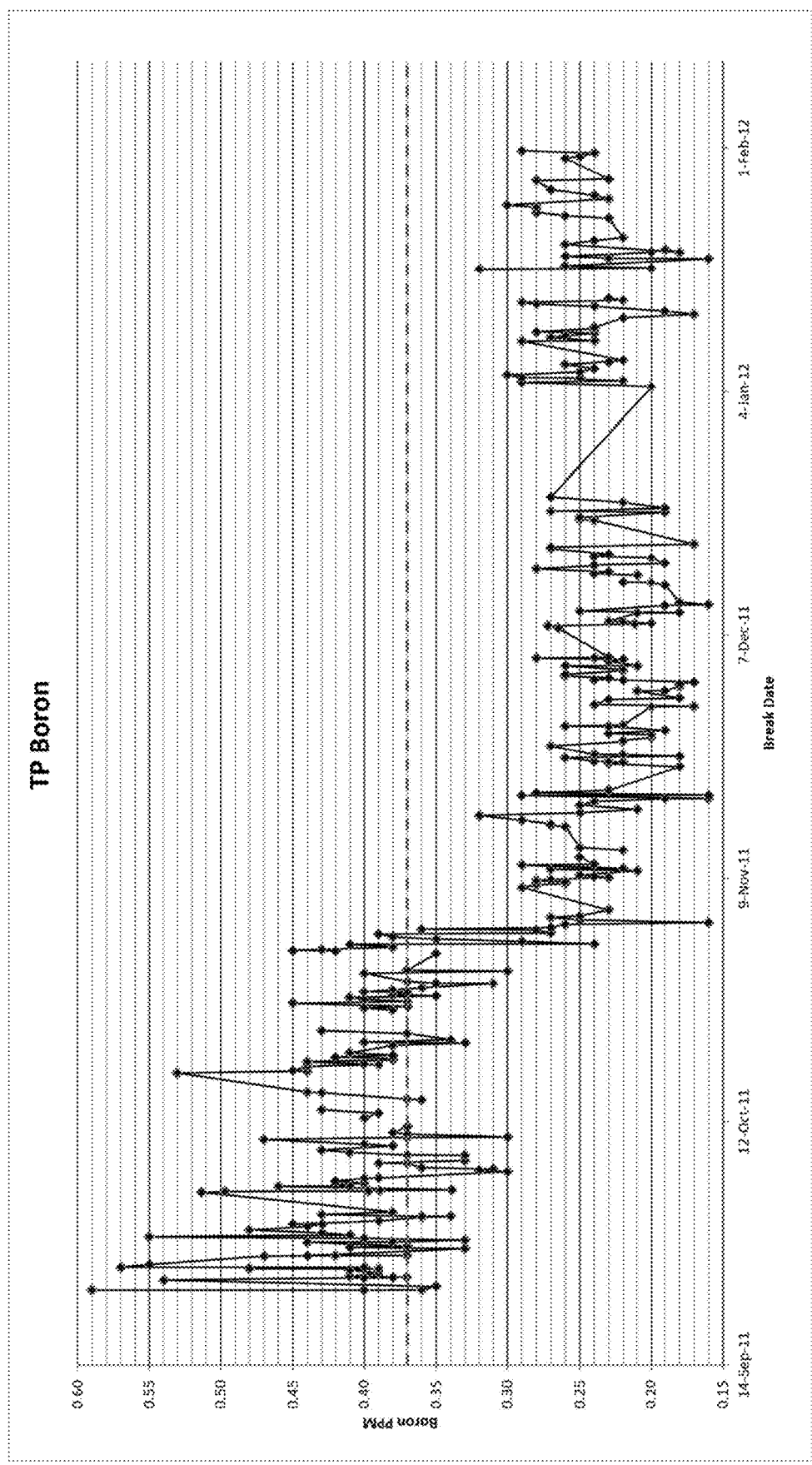
FIG. 4 illustrates the level of boron present in silicon flakes, for samples of silicon flakes obtained over a period of time.

FIG. 4 illustrates the level of boron present in silicon flakes, for samples of silicon flakes obtained over a period of time.

The invention claimed is:

1. A method for purifying aluminum, the method comprising:
(a) forming a molten liquid from aluminum and a metal additive selected from at least one of titanium, vanadium, zirconium, and chromium;
(b) allowing impurities to form in the molten liquid, wherein the impurities comprise a reaction product of the metal additive and boron;
(b) optionally removing at least a portion of the impurities from the molten liquid;
(d) cooling the molten liquid to form solidified aluminum; and
(e) optionally removing a portion of the solidified aluminum comprising at least a portion of the impurities;
wherein at least one of the optional steps is carried out, to provide purified aluminum comprising less than about 0.55 ppmw boron.

2. The method of claim 1, wherein at least some boron is removed, such that the purified aluminum contains less boron than the aluminum in step (a).

3. The method of claim 1, wherein at least about 200 ppmw metal additive is employed, relative to the aluminum.

4. The method of claim 1, wherein metal additive comprises titanium.

5. The method of claim 1, wherein the aluminum in step (a) comprises at least about 0.55 ppmw boron.

6. The method of claim 1, wherein the impurities that comprise a reaction product of metal additive and boron comprise titanium diboride ($TiB_2$).

7. The method of claim 1, wherein the metal additive is added to the aluminum in step (a), is added to the molten liquid, or a combination thereof.

8. The method of claim 1, wherein the optional step of removing the at least a portion of the impurities from the molten liquid is not carried out.

9. The method of claim 1, wherein the optional step of removing a portion of the solidified aluminum comprising at least a portion of the impurities is not carried out.

10. The method of claim 1, wherein the optional step of removing the at least a portion of the impurities from the molten liquid is carried out, and the optional step of removing a portion of the solidified aluminum comprising at least a portion of the impurities is carried out.

11. The method of claim 1, which is carried out two or more times.

12. The method of claim 1, wherein the step of forming the molten liquid occurs at a temperature of about 650° C.

* * * * *